United States Patent Office.

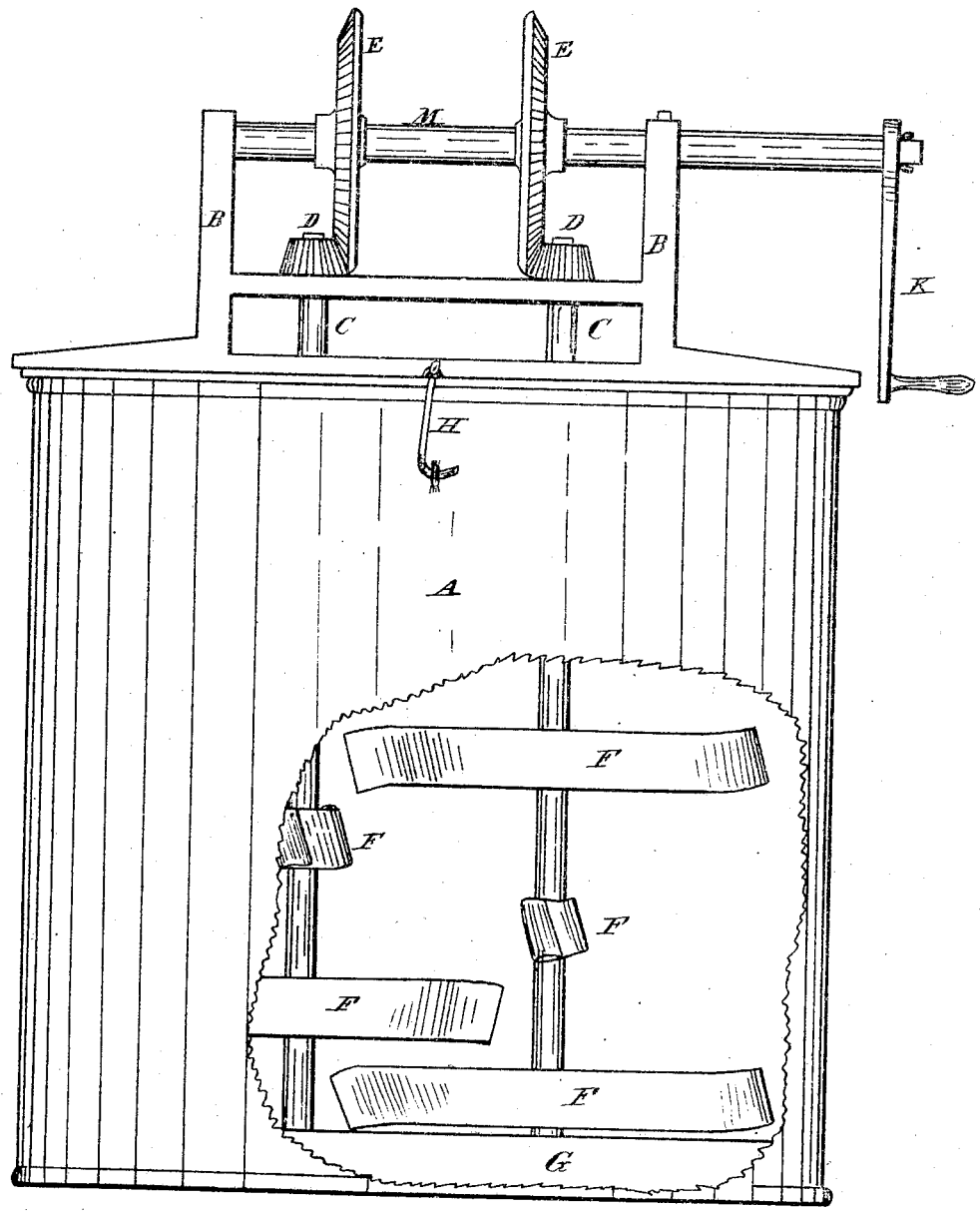

ISAAC J. SILER, OF ARCANUM, OHIO.

Letters Patent No. 73,659, dated January 21, 1868.

IMPROVEMENT IN CHURNS.

*The Schedule referred to in these Letters Patent and making part of the same.*

TO ALL WHOM IT MAY CONCERN:

Be it known that I, ISAAC J. SILER, of Arcanum, in the county of Darke, in the State of Ohio, have invented a new and improved Churn; and I do hereby declare that the following is a full and exact description thereof, reference being had to the accompanying drawings, and to the letters of reference marked thereon.

The nature of my invention consists in the use of two vertical shafts, revolving in opposite directions, the paddles or arms of which overlap each other, and which are of such form that, with the motion of the shafts, considerable agitation is produced, with but very slight displacement of the cream.

To enable others skilled in the art to make and use my invention, I will proceed to describe its construction and operation.

The figure represents the churn in perspective.

A represents a vessel made of tin, to the bottom of which is attached the piece G, in such manner as to be readily removed. This piece serves for bearings for the lower end of the shafts. To the lid is attached the cast-iron frame B, and which supports the shaft M and the upper ends of the shafts C C. The shaft M has upon it two cog-wheels, E E, and to the right end a crank, K. The wheels of the shaft M gear into the cog-wheels D D, which are attached to the upper ends of the dasher-shafts. To the shafts is attached a series of arms, F, which overlap each other, and are arranged at right angles on the shafts, and which form the dashers. These arms curve slightly, from the shaft outward, and the upper edge projects beyond the lower, in the direction in which they are made to rotate. This form of arm, while revolving, tends to press the cream towards the bottom; and, as the motion is in opposite directions, the cream set in motion by one dash is counteracted by the other, and thus a free agitation is secured without displacement within the churn.

Churns of this class throw the cream to the side of the vessel, and produce a movement unfavorable to gathering of the butter, while this causes the butter to collect as it is rapidly formed, as the agitation is more perfect than if the cream moves, with the dash, about the sides of the churn.

What I claim as my invention, and desire to secure by Letters Patent, is—.

The spiral arms F, and their arrangement with reference to the two shafts C C, forming a churn-dasher, substantially as and for the purpose specified.

ISAAC J. SILER.

Witnesses:
  C. H. BALDWIN,
  THOS. D. MITCHELL.